United States Patent [19]

Watanabe et al.

[11] Patent Number: 5,129,467
[45] Date of Patent: Jul. 14, 1992

[54] ELECTRIC HAMMER DRILL HAVING DUST COLLECTING DEVICE

[75] Inventors: Yoshihiko Watanabe; Yasuki Ohmori, both of Katsuta; Masaaki Sekizawa, Mito, all of Japan

[73] Assignee: Hitachi Koki Company Limited, Tokyo, Japan

[21] Appl. No.: 597,214

[22] Filed: Oct. 15, 1990

[30] Foreign Application Priority Data

Oct. 14, 1989 [JP] Japan .................. 1-266718

[51] Int. Cl.⁵ ............................................. B23B 47/34
[52] U.S. Cl. ................................... 173/75; 173/217; 408/56; 408/67
[58] Field of Search .............. 173/21, 163, 75, 78; 408/56, 67, 112; 175/209, 213

[56] References Cited

U.S. PATENT DOCUMENTS

| | | | |
|---|---|---|---|
| 1,955,182 | 4/1934 | Hall | 408/56 |
| 2,246,916 | 6/1941 | Fischer | 408/56 |
| 2,994,235 | 8/1961 | Rise | 408/112 |
| 4,051,880 | 10/1977 | Hestily | 408/67 |
| 4,097,176 | 6/1978 | Wanner et al. | |
| 4,200,417 | 4/1980 | Hager et al. | 408/67 |
| 4,207,953 | 6/1980 | Reibetanz et al. | |
| 4,250,971 | 2/1981 | Reibetanz et al. | |
| 4,563,115 | 1/1986 | Abe et al. | 408/67 |
| 4,921,375 | 5/1990 | Famulari | 408/67 |

FOREIGN PATENT DOCUMENTS

| | | |
|---|---|---|
| 2453791 | 5/1976 | Fed. Rep. of Germany . |
| 2705409 | 8/1978 | Fed. Rep. of Germany . |
| 2705410 | 8/1978 | Fed. Rep. of Germany . |
| 2940362 | 4/1981 | Fed. Rep. of Germany . |
| 3129375 | 4/1983 | Fed. Rep. of Germany . |
| 3605204 | 8/1987 | Fed. Rep. of Germany . |
| 1362495 | 4/1964 | France . |
| 2329392 | 5/1977 | France . |

*Primary Examiner*—Frank T. Yost
*Assistant Examiner*—Scott A. Smith
*Attorney, Agent, or Firm*—Lowe, Price, LeBlanc & Becker

[57] ABSTRACT

An electric hammer drill including a vacuum dust collecting device for collecting dust from an area of an article being drilled by a drill bit wherein a hose extending from a body of the hammer drill is directly connected to an end of a movable first pipe which is slidably received in a stationary second pipe. A fan for transporting the dust by vacuum is fixed on a shaft extending across a dust collecting chamber in the body. The shaft is coaxial with, and releasably coupled with, an armature shaft of a motor. With this releasable coupling, the armature shaft is relatively short and unlikely to bend or flex, so that vibration produced during a drilling operation is small. During the drilling operation, the first pipe slides back and forth along the second pipe as a suction hood moves in a direction opposite to the direction of movement of the drill bit. Since a sliding portion between the first and second pipes is separated by the hose from a path of conveyance of the dust, the first pipe and the hood connected thereto always move smoothly relative to the drill bit.

8 Claims, 5 Drawing Sheets

ELECTRIC HAMMER DRILL HAVING DUST COLLECTING DEVICE

BACKGROUND OF THE INVENTION

1. Field of the Invention

The present invention relates to an electric hammer drill having a dust collecting device for collecting duct produced during a drilling operation.

2. Description of the Prior Art

One known electric hammer drill of the type concerned is illustrated here in FIGS. 5 and 6. During a drilling operation using a drill bit 1, dust which is produced in the vicinity of the drill bit 1 is drawn by suction into a hood 2 of a vacuum dust collecting device. Subsequently, the dust is conveyed through a first pipe 3 connected at one end to the hood 2, through a second pipe 4 having one end slidably receiving the opposite end of the first pipe 3, and through a hose 5 having one end connected to the opposite end of the second pipe 4 and then is collected into a dust collecting chamber 6 defined in a body 7 of the hammer drill. Finally, the dust is discharged from the dust collecting chamber 6 into a dust bag 8 (FIG. 6) attached to the body 7. As the drilling operation proceeds, the body of the electric hammer drill moves forward. During that time, the hood 2 and the first pipe 3 retracts or moves backward. The second pipe 4 is fixedly attached to the body 7 via a side handle 9 and a holder 10. A compression coil spring 11 is disposed within the second pipe 4 and urges the first pipe 3 axially outwardly from the second pipe 4, so that the first pipe 3 is slidably movable relative to the second pipe 4 by and against the force of the spring 11.

The dust collecting chamber 6, as shown in FIG. 6, is defined jointly by first and second casings 12, 13 and houses a dust collecting fan 14 press-fitted to an armature shaft 15 of an electric motor 16 which is mounted in the body 7 for driving the drill bit 1 and the dust collecting fan 14. The armature shaft 15 extends across the dust collecting chamber 6 and is supported on opposite sides of the dust collecting chamber 6 by means of a pair of bearings 17. The dust collecting fan 14 is rotated by the motor 16 to draw the dust from the hood 2 into the dust collecting chamber 6 and then discharge the dust into the dust bag 8.

With this construction, the dust produced during a drilling operation tends to adhere to an inner peripheral wall of the second pipe 4 and the periphery of the spring 11, thereby hindering smooth sliding movement of the first pipe 3. In the worst case, the first and second pipes 3, 4 are locked together by the dust trapped therebetween. The conventional hammer drill is, therefore, unreliable in operation. Furthermore, due to the presence of the second pipe 4 extending between the first pipe 3 and the hose 5, the flow resistance of the dust collecting device is relatively large, and air may leak from a clearance between the first and second pipes 3, 4, thus lowering the dust collecting efficiency of the dust collecting device.

The armature shaft 15 extending across the dust collecting chamber 6 is relatively long and hence is likely to bend or flex during the drilling operation, causing an enhanced vibration of the body 7 of the electric hammer drill. Under such strongly vibrated condition, an armature winding of the motor 16 is likely to be damaged or otherwise broken. Since the dust collecting fan 14 and an end ring 19 are press-fitted to the armature shaft 15, they must be replaced together with the casing 5 when an armature 18 is to be replaced due to damage. The conventional electric hammer drill is, therefore, uneasy to maintain.

SUMMARY OF THE INVENTION

With the foregoing drawbacks of the prior art in view, it is an object of the present invention to provide an electric hammer drill having a dust collecting device which is reliable in operation and has a high dust collecting efficiency.

Another object of the present invention is to provide an electric hammer drill having a dust collecting device, which is capable of operating at a low amplitude of vibration and can be maintained with utmost ease.

In brief, an electric hammer drill of the present invention includes a vacuum dust collecting device for collecting dust from an area of an article being drilled by a drill bit. The dust collecting device includes a fan disposed in a dust collecting chamber in the body of the hammer drill for transporting the dust by vacuum. The fan is fixed on a shaft extending across the dust collecting chamber. The shaft is coaxial with, and releasably coupled with, an armature shaft of a motor. With this releasable coupling, the armature shaft is relatively short and unlikely to bend or flex, so that vibration produced during a drilling operation is small. The dust collecting device further includes a hose extending from the and directly connected to an end of a movable first pipe which is slidably received in a stationary second pipe. During the drilling operation, the first pipe slides back and forth along the second pipe as a suction hood moves in a direction opposite to the direction of movement of the drill bit. Since a sliding portion between the first and second pipes is separated by the hose from a path of conveyance of the dust, the first pipe and the hood connected thereto always move smoothly relative to the drill bit.

According to a first aspect of the invention, there is provided an electric hammer drill, comprising: a body having a motor disposed therein, the motor having an armature shaft; a drill bit detachably connected to the body and driven the motor for drilling an article to be drill; and a vacuum dust collecting device for collecting dust from an area of the article being drilled by the drill bit, the dust collecting device including a dust collecting chamber defined in the body, a dust collecting adapter disposed outside the body and communicating with the duct collecting chamber, the dust collecting adapter being movable relative to the drill bit, a fan rotatably disposed in the dust collecting chamber and fixed on a fan shaft extending across the dust collecting chamber, the fan shaft being operatively connected with the drill bit, and a dust bag detachably connected to the body and communicating with the dust collecting chamber, the armature shaft and the fan shaft being coaxial and releasably coupled with each other. Preferably, the armature shaft and the fan shaft are joined by a spline coupling, According to a second aspect of the invention, there is provided an electric hammer drill, comprising: a body; a drill bit detachably connected to the body for drilling an article to be drilled; and a vacuum dust collecting device for collecting dust from an area of the article being drilled by the drill bit, the dust collecting device including a hood covering the periphery of the drill bit and having a suction nozzle adapted to face the area of the article being drilled, a first pipe connected at one of its opposite ends to the hood and held in fluid communication with the suction nozzle, a second pipe secured to the body, extending parallel to a longitudinal axis of the drill bit, and slidably receiving the first pipe from the opposite end of the latter, a hose directly connected at one end to the opposite end of the first pipe and at the opposite end to the body, and resilient means acting between the first pipe and second pipe and urging the first pipe to project from the second pipe.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
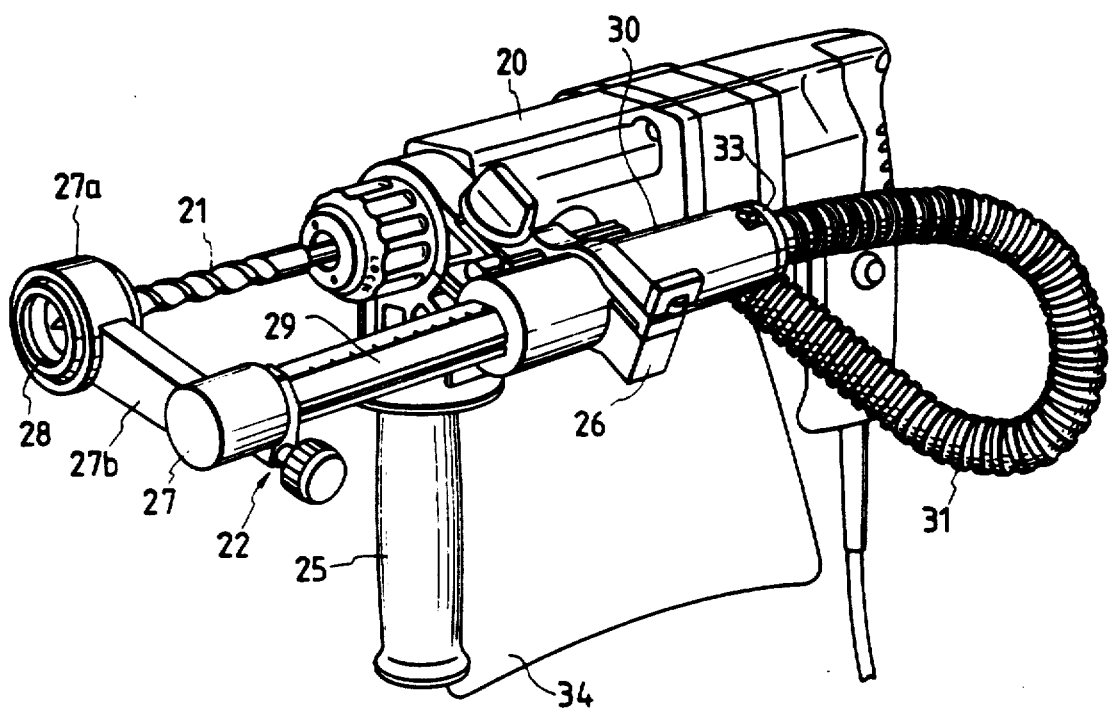
FIG. 1 is a schematic perspective view of an electric hammer drill having a dust collecting device according to the present invention.

As shown in FIG. 1, an electric hammer drill embodying the invention includes a body 20 having an electric motor (described later) disposed therein, a drill bit 21 releasably connected to the body 20 and driven by the motor for drilling an article made of concrete, rock and the like to be drilled, and a vacuum dust collecting device 22 for collecting dust produced from the article during a drilling operation. The body 20 includes a casing 23 (FIG. 2) defining a suction chamber 24 (FIG. 2) of the dust collecting device 22 in which a dust collecting fan, described later, is disposed. The fan is driven by the motor to draw air and dust suspended therein into the dust collecting chamber 24 and then discharge them from the dust collecting chamber 24. The hammer drill further includes a side handle 25 extending laterally from the body 20 for being gripped by an operator's hand, and a clamp or holder 26 projecting laterally from the body 20 for holding a second pipe, described later, of the dust collecting device 22.

Figure 2:
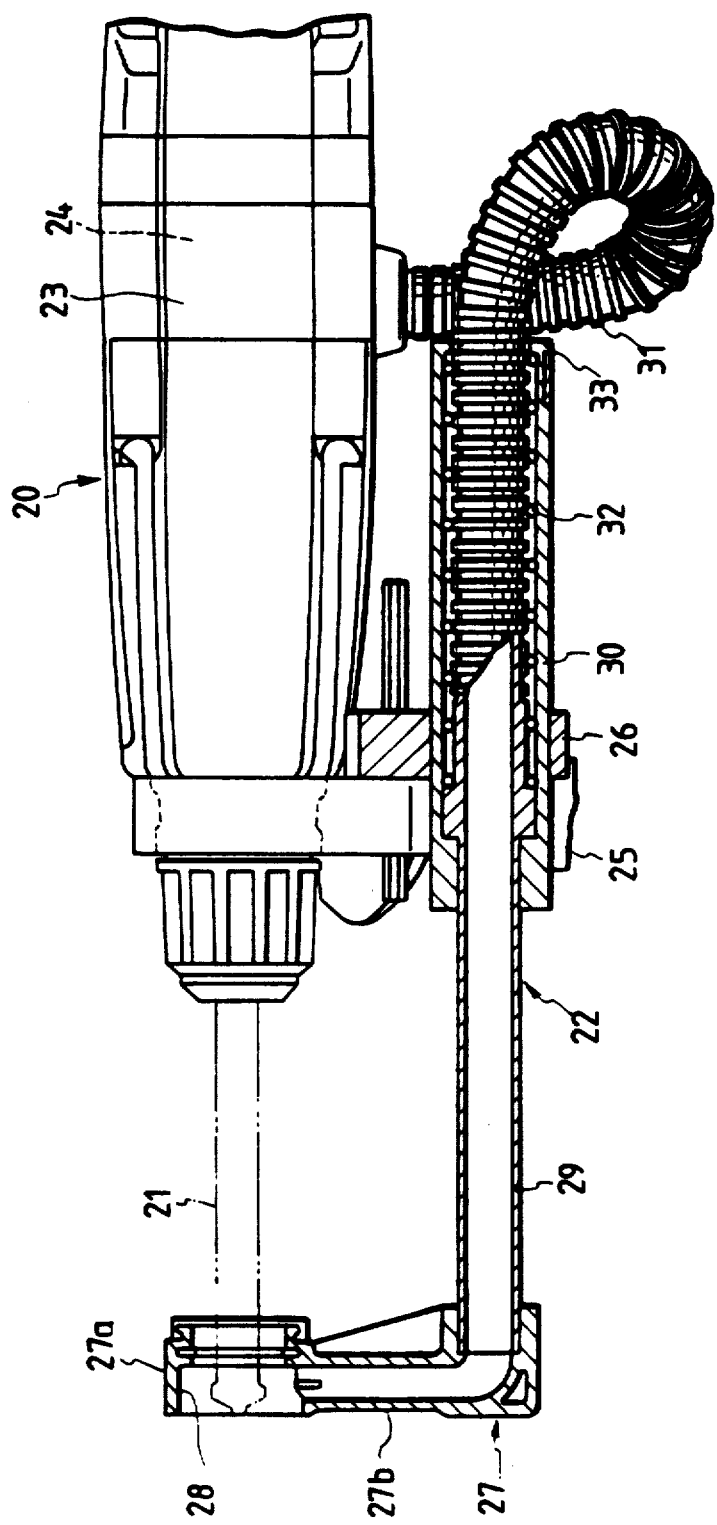
FIG. 2 is a fragmentary plan view, partly in cross section, of the electric hammer drill.

The dust collecting device 22 includes a suction hood 27 slidably movable along the drill bit 21 and circumferentially covering the drill bit 21. The suction hood 27 is composed of a hollow cylindrical body 27a having a circular suction nozzle 28 for opening to an area of the article being drilled to collect the duct produced from the drilled area, an elongate hollow wing 27b extending laterally from the cylindrical body 27a for guiding the dust from the suction nozzle 28 toward a first pipe 29. The first pipe 29, as better shown in FIG. 2, is connected at one end to the wing 27b of the suction hood 27 and held in fluid communication with the suction nozzle 28. The opposite end of the first pipe 29 is slidably received in a second pipe 30. The second pipe 30 extends parallel to an longitudinal axis of the drill bit 21 and is fixedly mounted on the body 20 by means of the holder 26. While the holder 26 is loosened, the second pipe 30 is movable in a longitudinal direction to vary the initial position of the suction hood 27. The opposite end of the first pipe 29 which is received in the second pipe 30 is directly connected to one end of a flexible hose 31. The flexible hose 31 has a bellows-like structure and hence is not only flexible in any direction but expansible and contractible in a longitudinal direction. A resilient means comprised of a compression coil spring 32 (FIG. 2) is disposed within the second pipe 30 and extends around a portion of the flexible hose 31 received in the second pipe 30. The compression coil spring 32 acts between the first pipe 29 and a tail cap 33 attached to an end of the second pipe 30 and urges the first pipe 29 to project outwardly from the second pipe 30. The opposite end of the flexible hose 31 is connected to a suction hole (not shown) communicating with the dust collecting chamber 24. The dust collecting camber 24 is also communicated with a discharge hole (not shown) to which a dust bag 34 (FIG. 1) is connected for collecting the dust which is suspended in air expelled from the discharge hole. The suction hood 27, the telescopically connected first and second pipes 29, 30 and the hose 31 jointly constitute a dust collecting adapter of the dust collecting device 22.

Figure 3:
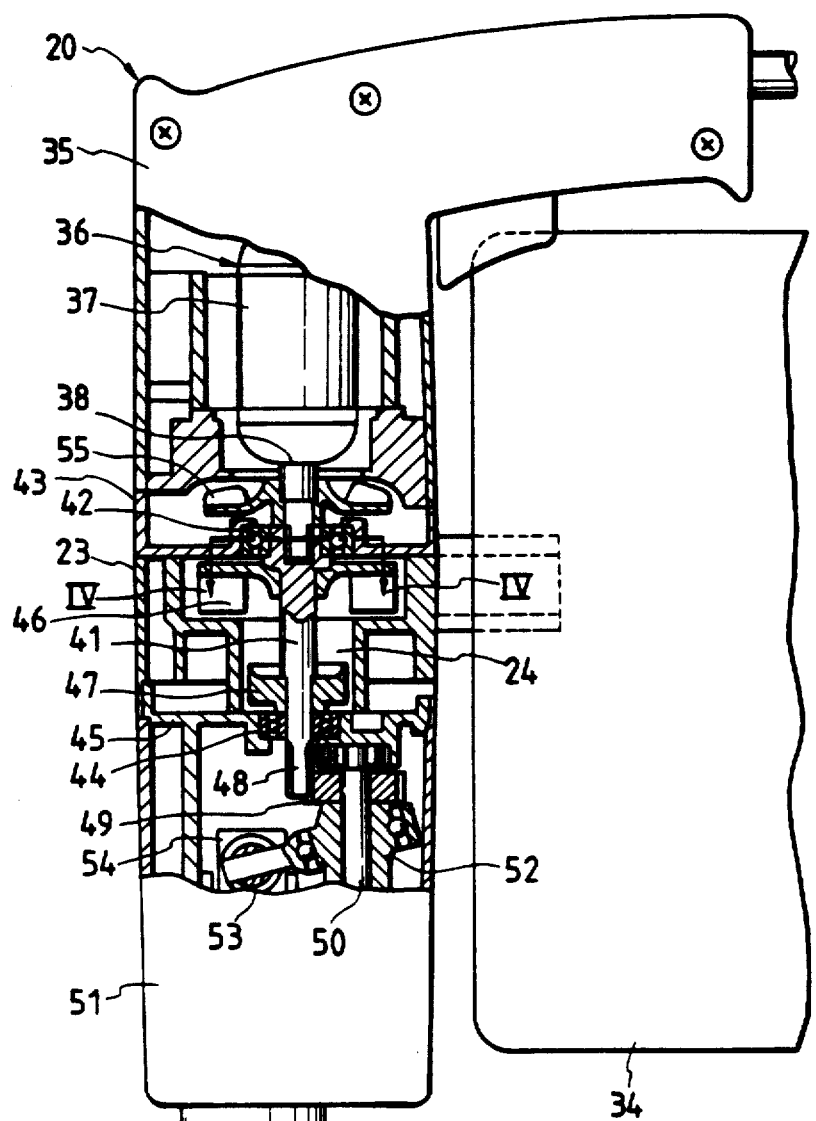
FIG. 3 is a fragmentary side view, with parts cutaway for clarity, of the electric hammer drill.
Figure 4:
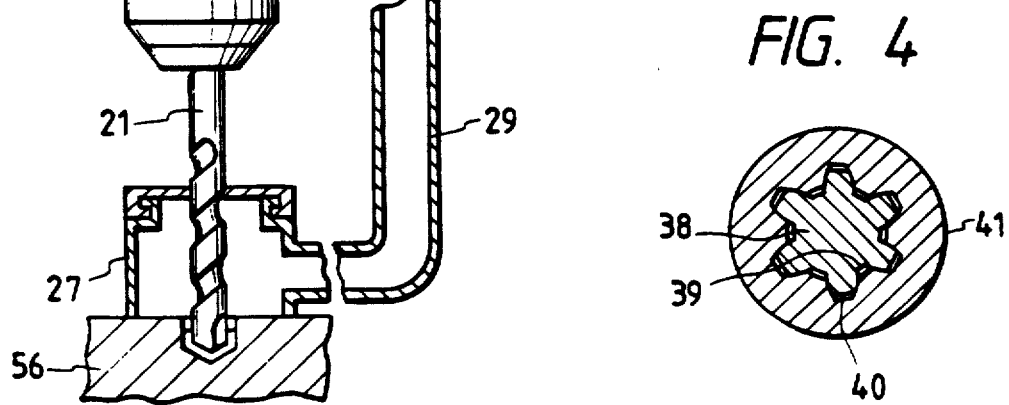
FIG. 4 is a cross-sectional view taken along line IV—IV of FIG. 3.
Figure 5:
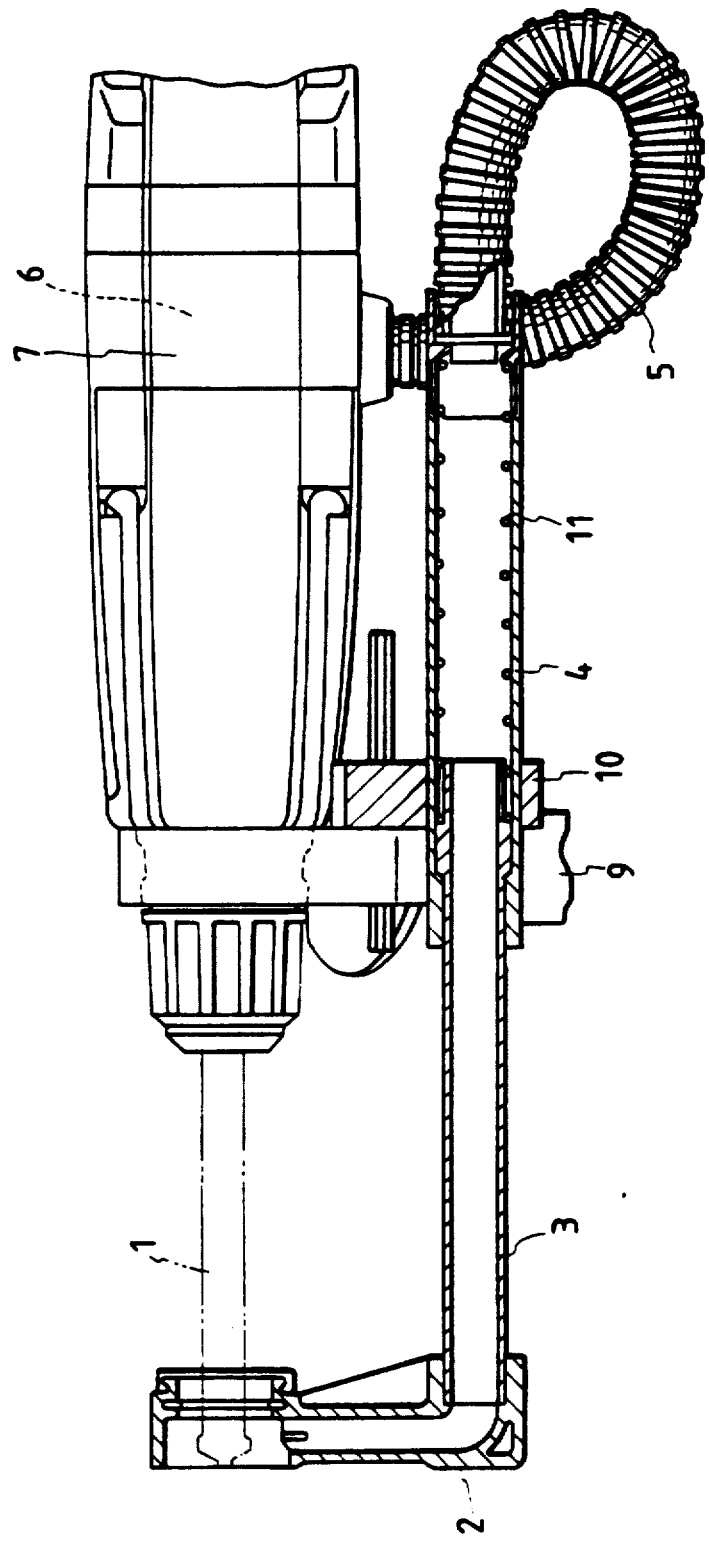
FIG. 5 is a fragmentary plan view, partly in cross section, of a conventional electric hammer drill having a dust collecting device.
Figure 6:
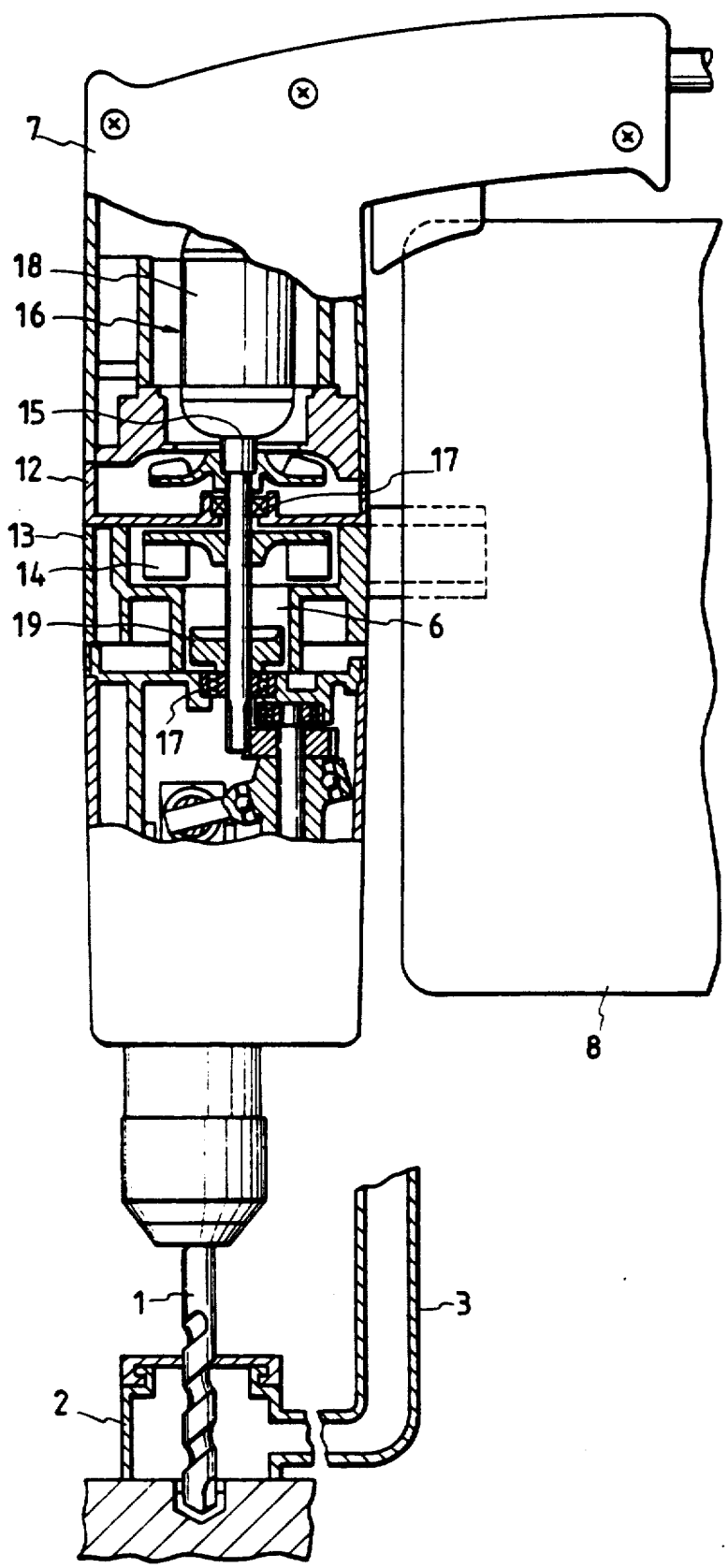
FIG. 6 is a fragmentary side view, with parts cutaway for clarity, of the conventional electric hammer drill.

As shown in FIG. 3, the body 20 of the electric hammer drill includes a housing 35 in which an electric motor 36 is mounted. The motor 36 includes an armature 37 having an armature shaft 38 whose output end is splined as shown in FIG. 4 at 39. The splined output end 39 of the armature shaft 38 is fitted with a splined hole 40 (FIG. 4) extending from an end of a pinion shaft 41. The pinion shaft 41 is coaxial with the armature shaft 38 and is rotatably supported by a roller bearing 42 mounted on a casing 43 secured to the housing 35 and also by a roller bearing 44 mounted on an inner cover 45 secured to the casing 23. The casing 23 is secured to the casing 43. The casings 43, 23 and the inner cover 45 jointly define the dust collecting chamber 24 in which a dust collecting fan 46 and an end ring 47 are disposed. The dust collecting fan 46 is disposed close to the casing 43 and fixed on the pinion shaft 41, while the end ring 47 is disposed close to the inner cover 45 and is fixed on the pinion shaft 41.

The opposite end of the pinion shaft 41 is toothed to provide a pinion 48. The pinion 48 is held in mesh with a first gear 49 fixed on one end of a gear shaft 50 rotatably mounted in a gear cover 51 secured to the inner cover 45. The gear shaft 50 fixedly supports thereon a reciprocating bearing 52 having a central hole extending at an angle to a longitudinal axis of the gear shaft 50, and a radially outwardly extending arm (not designated) articulated with a piston pin 53 of a piston 54. The piston 54 is slidably disposed in a cylinder (not shown) coaxial with the drill bit 21 and is operatively connected with the drill bit 21 via a hammer element and an intermediate element (neither shown) for exerting an impact force on the drill bit 21. The opposite end of the gear shaft 50 fixedly supports thereon a second pinion (not shown) meshing with a second gear (not shown) formed on an outer peripheral surface of the non-illustrated cylinder. Designated by 55 is a cooling fan fixed on the armature shaft 38 for cooling the motor 36.

With this construction, when the motor 36 is driven to rotate its armature 37, the pinion shaft 41 which is connected with the armature shaft 38 by a spline coupling (namely, the splined shaft end 39 and the splined hole 40), rotates at a same speed. In response to the rotation of the pinion shaft 41, the pinion 48 drives the first gear 49 to rotate the gear shaft 50. Rotation of the gear shaft 50 causes the radial arm of the reciprocating bearing 52 to wobble in a direction to reciprocate the piston 54 within the cylinder. In response to the reciprocating movement of the piston 54, the non-illustrated hammer element and intermediate element exert impact forces on the drill bit 21. At the same time, the cylinder is rotated by the gear shaft 50 via the non-illustrated second pinion and the non-illustrated second gear, so that the drill bit 21 is rotated. The reciprocating bearing 52 serves as a crank mechanism to change rotary motion of the gear shaft 50 into reciprocating motion of the piston 54. The pinion shaft 41, the gear shaft and the cylinder constitute a rotational force transmitting system for transmitting a rotational force from the motor 36 to the drill bit 21. The piston, the hammer element and the intermediate element constitute a hammering system for exerting an impact force on the drill bit 21. The hammering system is branched from the rotational force transmitting system via the crank mechanism.

In operation, a trigger switch of the electric hammer drill is pulled to energize the motor 36 whereupon the drill bit 21 rotates while moving back and forth. At the same time, the dust collecting fan 46 is rotated to draw air from the suction nozzle 28 into the dust collecting chamber 24 and then force air from the dust collecting chamber 24 into the dust bag 34. Then, the body 20 of the electric hammer drill is thrust toward a portion of an article 56 (FIG. 3) to be drilled. The advancing movement of the body 20 causes the suction hood 27 to engage the article in advance to the drill bit 21 being rotated. As the body 20 is further advanced, the drill bit 21 engages and then drills the article 56. During that time, since the drilled area is covered by the suction hood 27, dust produced from the article 56 being drilled is drawn by vacuum from the suction nozzle 28 into the suction hood 27 and then conveyed through the first pipe 29, and through the flexible hose 31 into the dust collection chamber 24. Subsequently, the dust is discharged from the dust collecting chamber 24 into the dust bag 34. Advancing movement of the body 20 and the drill bit 21 causes the suction hood 27 to retract or move back toward the body 20. Simultaneously with this retracting movement of the suction hood 27, the first pipe 29 slides into the second pipe 30 against the force of the compression coil spring 32.

Since the first pipe 29 is directly connected to the flexible hose 31, a path of conveyance of the dust is separated from a sliding portion between the first and second pipes 29, 30. Consequently, the sliding portion is always free from dust and insures smooth sliding movement of the first pipe 29 relative to the second pipe 30. Furthermore, owing to the direct connection between the first pipe 29 and the flexible hose 31, the dust conveyance path has a smaller flow resistance than that of the conventional hammer drill shown in FIG. 3 and is free from leakage from a clearance between the first and second pipes 29, 30. The dust collecting device 22 of the invention has a high dust collecting efficiency.

Since the armature shaft 38 does not extend across the dust collecting chamber 24, it is relatively short and unlikely to bend or flex. Consequently, only a small vibration is produced during a drilling operation. Furthermore, the armature shaft 38 is releasably coupled with the pinion shaft 41 on which the dust collecting fan 46 is fixedly mounted. With this releasable coupling between the motor side and the fan side, replacement of one side does not require replacement of another. Thus, the electric hammer drill of the invention is easy to maintain.

Obviously various minor changes and modifications of the present invention are possible in the light of the above teaching. For example, the suction hood 27 and the first pipe 29 may be integral. The flexible hose 31 may be substituted by a general hose of an elastic material. The dust collecting device 22 of the invention is applicable to other appliances such as vacuum cleaners having a hose connected to a cleaning head or attachment via telescopically connected pipes. Furthermore, the spline coupling may be substituted by a key coupling, a tongue-and-socket coupling, etc. It is therefore to be understood that within the scope of the appended claims the invention may be practiced otherwise than as specifically described.

What is claimed is:

1. An electric hammer drill, comprising:
   a body;
   a drill bit detachably connected to said body for drilling an article to be drilled; and
   a vacuum dust collecting device for collecting dust from an area of the article being drilled by said drill bit, said dust collecting device including
   a hood covering the periphery of said drill bit and having a suction nozzle adapted to face the area of the article being drill,
   a first pipe having opposite ends, said first pipe being connected at one of the opposite ends to said hood and held in fluid communication with said suction nozzle,
   a second pipe secured to said body, extending parallel to a longitudinal axis of said drill bit, and slidably receiving said first pipe from the other of the opposite ends,
   a hose having first and second ends, said hose being directly connected at said first end to said other of the opposite ends of said first pipe and at said second end to said body, wherein said hose extends within substantially the entire length of said second pipe when said first pipe projects from said second pipe, and
   resilient means acting between said first pipe and second pipe and urging the first pipe to project from said second pipe.

2. An electric hammer drill according to claim 1 wherein said resilient means comprises a compression coil spring disposed within said second pipe and extending around a portion of said hose received in said second pipe.

3. An electric hammer drill according to claim 1 wherein said hose is expansible and contractible in a longitudinal direction.

4. An electric hammer drill according to claim 3 wherein said hose is a flexible hose.

5. An electric hammer drill, comprising:
   a body having a motor disposed therein, said motor having an armature shaft;
   a drill bit detachably connected to said body and driven said motor for drilling an article to be drilled; and
   a vacuum dust collecting device for collecting dust from an area of the article being drilled by said drill bit, said dust collecting device including a dust collecting chamber defined in said body, a dust collecting adapter disposed outside said body and communicating with said dust collecting chamber, said dust collecting adapter being movable relative to said drill bit, a fan rotatably disposed in said dust collecting chamber and fixed on a fan shaft extending across said dust collecting chamber, said fan shaft being operatively connected with said drill bit, and a dust bag detachably connected to said body and communicating with said dust collecting chamber, said armature shaft and said fan shaft being coaxial and releasably coupled with each other, said dust collecting adapter further comprising a hood covering the periphery of said drill bit and having a suction nozzle adapted to face the area of the article being drilled, a first pipe having opposite ends, said first pipe being connected at one of the opposite ends to said hood and held in fluid communication with said suction nozzle, a second pipe secured to said body, extending parallel to a longitudinal axis of said drill bit, and slidably receiving said first pipe from the other of the opposite ends, a hose having a first and second end, said hose being directly connected at said first end to said one of the opposite ends of said first pipe and at said second end to said body 32, after "body" insert, wherein said hose extends within substantially the entire length of said second pipe when said first pipe projects from said second pipe, and resilient means acting between said first pipe and second pipe and urging the first pipe to project from said second pipe.

6. An electric hammer drill according to claim 5 wherein said resilient means comprises a compression coil spring disposed within said second pipe and extending around a portion of said hose received in said second pipe.

7. An electric hammer drill according to claim 5 wherein said hose is expansible and contractible in a longitudinal direction.

8. An electric hammer drill according to claim 7 wherein said hose is a flexible hose.

* * * * *